(12) United States Patent  
Dedeoglu et al.

(10) Patent No.: US 8,838,629 B2  
(45) Date of Patent: Sep. 16, 2014

(54) ANONYMOUS INFORMATION EXCHANGE

(75) Inventors: Mehmet E. Dedeoglu, Plainsboro, NJ (US); Iwao Fusillo, Merrick, NY (US); Eddie J. Alvarez, West Windsor, NJ (US); Qaiser S. Shakeel, Piscataway, NJ (US); Andrew E. Roth, Scarsdale, NY (US); Lewis A. Tierney, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 795 days.

(21) Appl. No.: 12/605,052

(22) Filed: Oct. 23, 2009

(65) Prior Publication Data

US 2011/0099202 A1   Apr. 28, 2011

(51) Int. Cl.
  *G06F 7/00*     (2006.01)
  *G06F 17/30*    (2006.01)
  *G06Q 30/02*    (2012.01)

(52) U.S. Cl.
  CPC .......... *G06F 17/30702* (2013.01); *G06Q 30/02* (2013.01)
  USPC ....................................... 707/758

(58) Field of Classification Search
  USPC .................................. 707/692, 758
  See application file for complete search history.

(56) References Cited

U.S. PATENT DOCUMENTS

| | | | |
|---|---|---|---|
| 2002/0073138 A1* | 6/2002 | Gilbert et al. | 709/201 |
| 2003/0009368 A1* | 1/2003 | Kitts | 705/10 |
| 2006/0031301 A1* | 2/2006 | Herz et al. | 709/206 |

* cited by examiner

*Primary Examiner* — Hosain Alam  
*Assistant Examiner* — Van Oberly  
(74) *Attorney, Agent, or Firm* — Snell & Wilmer L.L.P.

(57) ABSTRACT

A third party facilitates exchange of customer data between first and second entities while maintaining customer privacy. Personally identifiable information (PII) and first entity customer attributes of a first set of customers are received from a first entity. PII for a second set of customers is received from a second entity. First and second set common customers are identified using the PII of the first and the second set of customers. Subsequently, a list of third set of customers is sent to the second entity. The list of third set of customers includes the common customers and a plurality of other customers from the second set of customers. Second entity customer attributes are received for each customer in the list of third set of customers. Further, the first entity customer attributes of the common customers and the second entity customer attributes of the common customers are linked.

16 Claims, 14 Drawing Sheets

| e-mail address | Segmented | Seg. A | Seg. B | Seg. C | Seg. D |
|---|---|---|---|---|---|
| User1@abc.com | 1 | 1 | 0 | 0 | 0 |
| User2@xyz.com | 1 | 0 | 1 | 0 | 0 |
| User3@123.com | 1 | 0 | 0 | 0 | 1 |
| User4@abc.com | 1 | 1 | 0 | 0 | 0 |
| User5@xyz.com | 1 | 0 | 0 | 0 | 1 |
| User6@123.com | 1 | 1 | 1 | 0 | 0 |
| User7@abc.com | 0 | 0 | 0 | 0 | 0 |
| User8@xyz.com | 0 | 0 | 0 | 0 | 0 |

*FIG. 4*

| Identifier specific to online advertiser | e-mail address |
|---|---|
| 123 | User1@abc.com |
| 234 | User2@xyz.com |
| 345 | User3@123.com |
| 456 | User9@abc.com |
| 567 | User10@xyz.com |
| 678 | User11@123.com |
| 789 | User12@xyz.com |
| 012 | User13@123.com |

| Identifier specific to online advertiser | e-mail address |
|---|---|
| 123 | User1@abc.com |
| 234 | User2@xyz.com |
| 345 | User3@123.com |

*FIG. 6*

| | Identifier specific to online advertiser — 308 |
|---|---|
| Common customers between the credit card issuer and the online advertiser (They are 10 % of the list) | 123 |
| | 234 |
| | 345 |
| Customers of the online advertiser that are not common with the credit card issuer (They are 90 % of the list) | 567 |
| | 678 |
| | . . |
| | 012 |
| | 015 |

*FIG. 7*

| Random identifier | Att. 1 | Att. 2 | Att. 3 | Att. 4 | Att. 5 | Seg. A | Seg. B | Seg. C | Seg. D |
|---|---|---|---|---|---|---|---|---|---|
| 1111 | A | B | C | D | E | 1 | 0 | 0 | 0 |
| 2222 | A | C | E | B | A | 0 | 1 | 0 | 0 |
| 3333 | B | C | A | D | B | 0 | 0 | 0 | 1 |

| Type of group | e-mail address | Identifier specific to online advertiser | Number of times logged in | Number of times exposed | Number of times clicked |
|---|---|---|---|---|---|
| New advertisement model TEST | User1@abc.com | 123 | 23 | 12 | 9 |
| | User9@abc.com | 456 | 11 | 8 | 2 |
| | User10@xyz.com | 567 | 5 | 4 | 0 |
| New advertisement model CONTROL | User11@123.com | 678 | 2 | N/A | N/A |
| | User3@123.com | 345 | 34 | N/A | N/A |
| | User12@xyz.com | 789 | 7 | N/A | N/A |
| Existing advertisement model TEST | User13@123.com | 012 | 28 | 16 | 13 |
| | User2@xyz.com | 234 | 11 | 5 | 1 |
| | User14@abc.com | 013 | 19 | 15 | 4 |
| Existing advertisement model CONTROL | User15@xyz.com | 014 | 48 | N/A | N/A |
| | User16@123.com | 015 | 21 | N/A | N/A |
| | User17@xyz.com | 016 | 8 | N/A | N/A |

*FIG. 10*

| | e-mail address |
|---|---|
| Common customers between the credit card issuer and exposed customers of the online advertiser (They are 10 % of the list) | User1@abc.com |
| | User2@xyz.com |
| | User3@123.com |
| Customers of the credit card issuer that are not common with the exposed customers of the online advertiser (They are 90 % of the list) | User4@abc.com |
| | User5@xyz.com |
| | . . |
| | User6@123.com |
| | User7@abc.com |

| e-mail address | Pre-Test Campaign | | | | Test Campaign | | | | Segment |
|---|---|---|---|---|---|---|---|---|---|
| | Transactions at Advertiser | | Total Transactions | | Transactions at Advertiser | | Total Transactions | | |
| | # | $ | # | $ | # | $ | # | $ | |
| User1@abc.com | 15 | 5600 | 21 | 8600 | 13 | 7000 | 19 | 11650 | A |
| User2@xyz.com | 8 | 1200 | 17 | 2800 | 9 | 3400 | 16 | 6400 | B |
| User3@123.com | 12 | 800 | 13 | 1300 | 1 | 700 | 2 | 1100 | D |
| User5@xyz.com | 16 | 1400 | 23 | 4900 | 2 | 1380 | 5 | 3180 | C |
| User6@123.com | 2 | 3700 | 5 | 8200 | 4 | 5500 | 12 | 9900 | A |
| User7@abc.com | 4 | 5800 | 5 | 6900 | 2 | 4000 | 3 | 5200 | B |
| User16@123.com | 10 | 1300 | 18 | 5300 | 9 | 1400 | 20 | 5500 | D |

| Random Identifier | Pre-Test Campaign | | | | Test Campaign | | | | Test - Control Cells | Segment | Number of times logged in | Number of times exposed | Number of times clicked |
|---|---|---|---|---|---|---|---|---|---|---|---|---|---|
| | Transactions at $ | | Total Transactions | | Transactions at $ | | Total Transactions | | | | | | |
| | # | $ | # | $ | # | $ | # | $ | | | | | |
| 7777 | 15 | 5600 | 21 | 8600 | 13 | 7000 | 19 | 11650 | New Adv. Model Test | A | 23 | 12 | 9 |
| ... | ... | ... | ... | ... | ... | ... | ... | ... | ... | ... | ... | ... | ... |
| 9999 | 12 | 800 | 13 | 1300 | 1 | 700 | 2 | 1100 | New Adv. Model Control | D | 34 | N/A | N/A |
| ... | ... | ... | ... | ... | ... | ... | ... | ... | ... | ... | ... | ... | ... |
| 8888 | 8 | 1200 | 17 | 2800 | 9 | 3400 | 16 | 6400 | Existing Adv. Model Test | B | 11 | 5 | 1 |
| ... | ... | ... | ... | ... | ... | ... | ... | ... | ... | ... | ... | ... | ... |
| 6666 | 10 | 1300 | 18 | 5300 | 9 | 1400 | 20 | 5500 | Existing Adv. Model Control | D | 21 | N/A | N/A |
| ... | ... | ... | ... | ... | ... | ... | ... | ... | ... | ... | ... | ... | ... |

320

ANONYMOUS INFORMATION EXCHANGE

BACKGROUND OF THE INVENTION

1. Field of the Invention

The present invention generally relates to customer information management, and more specifically to methods, systems, and computer program products for anonymous exchange of customer information between business entities.

2. Background Art

Business entities store customer information for a variety of business objectives such as customer profiling, targeted advertising, designing custom promotions, and the like. For example, business entities with advertisement driven revenue models, such as search engines or free email service providers, may store information about the customer's interest in various product or service categories to show them relevant advertisements. Similarly, a tour and travel service provider may store its customer's frequency of travel, preferred destination categories, budget per trip, and the like, to analyze the profile of its customers and offer appropriately tailored holiday packages. Banking and Financial services (BFS) providers may store information about their customer's spending segmented by product/service segments, the time/frequency of spend, and the like. The BFS providers may use this information, for example, to expose the customer to promotions for relevant products and services, particularly at the time of the month when the customer is most likely to make a purchase. Advances in information technology have offered business entities increasingly convenient ways to collect, manage, and analyze such customer information to better achieve their business objectives.

In many instances, business entities may desire to exchange information about customers that they have in common. This may help the entities to augment their knowledge of their customers and take better business decisions. For example, consider a tour and travel service provider that has certain customers in common with a BFS provider. The tour and travel service provider may store information about the holiday preferences of these customers such as whether they like to visit beaches, ski resorts, or big cities. The BFS provider, on the other hand, may store information such as annual income or annual spend on various products and services. If these two entities share their customer information, the tour and travel service provider may learn, for example, that the customers who like to visit beaches usually have a lower annual income. The tour and travel service provider may in turn choose to develop relatively low cost beach vacation packages to boost sales in this segment.

However, the customer information held by business entities is often confidential. More particularly, the business entities often cannot disclose Personally Identifiable Information (PII) of their customers. Personally Identifiable Information (PII) includes any information item, or a combination of more than one information items, which uniquely identifies the associated customer. Examples of PII include the customer's e-mail address, social security number (SSN), mobile phone number, and the like. Other examples of PII include combinations of one or more of the customer's name, mailing address, date of birth, and the like. In some instances, the customer's PII may be subject to privacy regulations. Further, the business entity may have a contractual obligation not to disclose their customers' PII. In addition, a business entity may decide not to share their customers' PII with other entities due to business considerations irrespective of regulations or contractual obligations. For example, the entity may want to be viewed as an organization that maintains a high level of customer privacy. Further, the entity may not want other entities to gain detailed information about its customers for competitive reasons.

Therefore, business entities often involve a third party for the exchange of customer information with each other. The third party receives customer information, including PII, from all participating business entities that wish to exchange customer information. The third party then identifies common customers of the participating business entities using the customer's PII, and creates an anonymous record for each common customer. The anonymous record includes the customer's information from the two or more participating entities, but does not include the customer's PII. The third party may then share such anonymous records with one or more of the participating entities without violating the customer privacy of any entity.

However, this solution requires the participating entities to share their entire customer information with the third party. This often requires the transfer of large volumes of data between the participating entities and the third party. The transfer and processing of such large volumes of data may require a large amount of network and computing resources, and may lead to delays in the information exchange process. In many instances, the aforementioned factors may be significant enough to call the feasibility of the information exchange process into question.

For the foregoing reasons, there is a need in the art for an efficient and scalable method, system, and computer program product for sharing customer information between business entities within the associated privacy constraints.

BRIEF SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Consistent with the principles of the present invention as embodied and broadly described herein, the present invention meets the above-mentioned needs by providing methods, systems and computer program products for exchanging customer information between a first entity and a second entity without exchanging personally identifiable information of customers.

According to one embodiment, there is disclosed a method for processing customer information of a first entity and a second entity. The method includes receiving one or more personally identifiable information (PII) and first entity customer attributes of a first set of customers from a first entity. The method further includes receiving PII for a second set of customers from a second entity. The method further comprises identifying common customers between the first set of customers and the second set of customers using the PII of the first and the second set of customers. Subsequently, a list of third set of customers is sent to the second entity. The list of third set of customers includes the common customers and a plurality of other customers from the second set of customers. The method further comprises receiving second entity customer attributes for each customer in the list of third set of customers. Further, the first entity customer attributes of the common customers and the second entity customer attributes of the common customers are linked. Moreover, the linking leads to the elimination of the PII associated with each of the common customers.

According to another embodiment, there is disclosed a system for processing customer information of a first entity and a second entity. Various embodiments of the system include a memory and at least one processor coupled with the memory. The memory may be configured to store a plurality of processing instructions for directing the at least one processor to receive one or more personally identifiable information (PII) and first entity customer attributes of a first set of customers from the first entity. The at least one processor may be further configured to receive PII for a second set of customers from a second entity. Further, the system identifies common customers between the first set of customers and the second set of customers using the PII of the first and the second set of customers. Additionally, the system sends a list of third set of customers to the second entity. The list of third set of customers includes the common customers and a plurality of other customers from the second set of customers. Then the at least one processor may be further configured to receive second entity customer attributes for each customer in the list of third set of customers. Further, the system links the first entity customer attributes of the common customers and the second entity customer attributes of the common customers. Moreover, the linking leads to the elimination of the PII associated with each of the common customers.

According to another embodiment, there is provided a computer program product for processing information of a first entity and a second entity. The computer program product includes a computer usable medium having control logic stored therein for causing a computer to process information of the first entity and the second entity. The control logic includes a first, second, third, fourth, fifth and sixth computer readable program code. The first computer program code means causes the computer to receive personally identifiable information (PII) and first entity customer attributes of a first set of customers from a first entity. The second computer readable program code means causes the computer to receive PII for a second set of customers from a second entity. The third computer readable program code means causes the computer to identify common customers between the first set of customers and the second set of customers using the PII of the first and the second set of customers. The fourth computer readable program code means causes the computer to send a list of third set of customers to the second entity. The list of third set of customers includes the common customers and a plurality of other customers from the second set of customers. The fifth computer readable program code means causes the computer to receive second entity customer attributes for each customer in the list of third set of customers. The sixth computer readable program code means causes the computer to link the first entity customer attributes of the common customers and the second entity customer attributes of the common customers. Moreover, the linking leads to the elimination of the PII associated with each of the common customers.

Various embodiments of the present invention provide systems, methods and computer program products for exchanging customer information between a first entity and a second entity without exchanging personally identifiable information of customers. The various embodiments may also include performing one or more of the aforementioned functions independently and in any order, as per the need.

Further features and advantages of the present invention as well as the structure and operation of various embodiments of the present invention are described in detail below with reference to the accompanying drawings.

BRIEF DESCRIPTION OF THE DRAWINGS/FIGURES

Features and advantages of the present invention will become more apparent from the detailed description set forth below when taken in conjunction with the drawings, in which like reference numbers indicate identical or functionally similar elements. Additionally, the left-most digit of a reference number identifies the drawing in which the reference number first appears. The drawings, which are incorporated in and constitute part of the specification, illustrate embodiments of the invention and, together with the general description given above and the detailed descriptions of embodiments given below, serve to explain the principles of the present invention. In the drawings:

FIG. 4 illustrates an example customer information table representing customer information of the credit card issuer's customers, according to an embodiment of the present invention;

FIG. 5 illustrates an example personal information table representing personal information of the online advertiser's customers, according to an embodiment of the present invention;

FIG. 6 illustrates an example common customer table representing common customer between the credit card issuer and the online advertiser, according to an embodiment of the present invention;

FIG. 7 illustrates an example combined customer table representing the common and non-common customers of the credit card issuer and the online advertiser, according to an embodiment of the present invention;

FIG. 9 illustrates an example linked behavioral characteristics table representing linked segment characteristics and the online characteristics of the common customers, according to an embodiment of the present invention;

FIG. 10 illustrates an example test campaign results table representing campaign results for exposed customers of the online advertiser, according to an embodiment of the present invention;

FIG. 11 illustrates an example combined customer table representing the common and non-common customers of the exposed customers and the credit card issuer's customers, according to an embodiment of the present invention;

FIG. 12 illustrates an example transaction data attributes table representing spend behavior attributes of the combined customers, according to an embodiment of the present invention;

FIG. 13 illustrates an example transaction and campaign result attributes table representing the campaign results and the spend behavior attributes for the common customers of the exposed customers and the credit card issuer's customers.

DETAILED DESCRIPTION OF THE INVENTION

I. Overview

Figure 1:
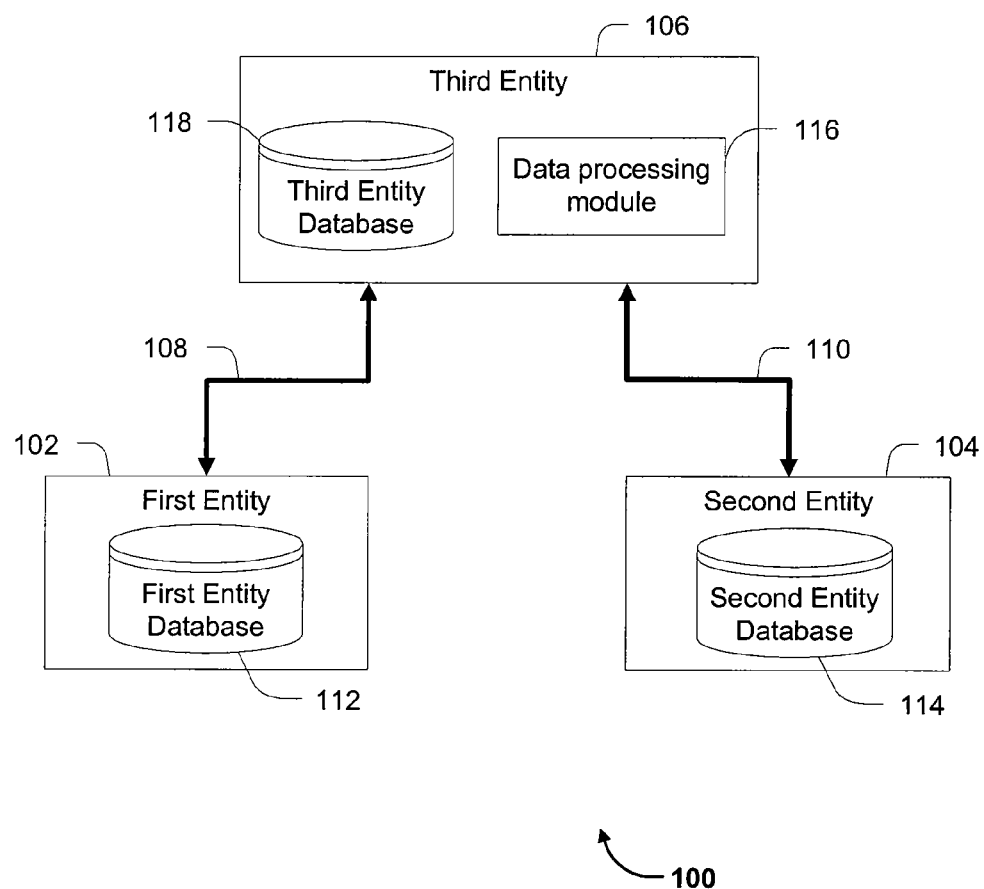
FIG. 1 is a schematic representation of an example system, according to an embodiment of the present invention.

The present invention is directed to methods, systems, and computer program products for anonymously exchanging customer information between business entities.

The present invention described herein discloses systems, methods and computer program products for processing customer information of a first entity and a second entity by a third entity. The third entity processes the customer information received from the first entity and the second entity and may provide the processed customer information to either entity without exchanging personally identifiable information of customers. Apt implementations of the various embodiments of the invention may lead to an optimal business scenario that enables the entities to leverage each other's customer level information for better targeting of products and services for customers without violating privacy policies of the concerned entities.

The detailed description of exemplary embodiments of the invention herein makes reference to the accompanying drawings and figures, which show the exemplary embodiments by way of illustration only. While these exemplary embodiments are described in sufficient detail to enable those skilled in the art to practice the invention, it should be understood that other embodiments may be realized and that logical and mechanical changes may be made without departing from the spirit and scope of the invention. It will be apparent to a person skilled in the pertinent art that this invention can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention is described herein with reference to system architecture, block diagrams and flowchart illustrations of methods, and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The present invention is now described in more detail herein in terms of the above disclosed exemplary embodiments of system, processes and computer program products. This is for convenience only and is not intended to limit the application of the present invention. In fact, after reading the following description, it will be apparent to one skilled in the relevant art(s) how to implement the following invention in alternative embodiments.

TERMINOLOGY

The term "customer" shall mean any person, entity, or the like that is associated with the first entity and/or the second entity. The customer may be associated with either entity who has a history of making any transaction/purchases with that entity or who has an online relationship associated with the entity.

The term "personally identifiable information" (PII) of a customer shall mean any information that may be used to uniquely identify the customer. Examples of PII for a customer may include, but are not limited to, an e-mail address, a telephone number, a Social Security Number (SSN), and the like. Further, PII may include a combination of two or more information fields that collectively may be used to uniquely identify a customer. For example, the customer's full name and street address may collectively constitute PII.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

The present invention is now described in more detail herein in terms of the above disclosed exemplary embodiments of system, processes and computer program products. This is for convenience only and is not intended to limit the application of the present invention. In fact, after reading the following description, it will be apparent to one skilled in the relevant art(s) how to implement the following invention in alternative embodiments.

II. System Overview

FIG. 1 is a schematic representation of an example system 100, according to an embodiment. The example system 100 includes a first entity 102, a second entity 104, and a third entity 106. First entity 102 and third entity 106 are communicatively coupled through a communication link 108, and second entity 104 and third entity 106 are communicatively coupled through a communication link 110. In various embodiments, communication links 108 and 110 are secure channels suitable for communicating confidential information. For example, communication links 108 and 110 may be, without limitation, Virtual Private Network (VPN) links, encrypted communication links such as Secure File Transfer Protocol and the like, or combinations thereof. Communication links 108 and 110 may be formed over a wide area network (WAN), a local area network (LAN), and combinations thereof. It will be apparent to a person skilled in the art that any form of secure communication may be used to enable communication links 108 and 110 without deviating from the spirit and scope of the present invention.

As shown in example system 100 of FIG. 1, first entity 102 includes a first entity database 112. First entity database 112 stores customer information of first entity 102. The customer information in first entity database 112 may include PII as well as other information that does not uniquely identify the customer with whom it is associated. Customer information may include, for example, personal details of the customers such as name, date of birth, postal address, email address, social security number (SSN), and the like. Moreover, customer information may further include, for example, the transaction details of the customer such as the amount spent on various product and service segments such as fashion, jewelry, financial products, and so on. Other examples of customer information include the customer's online behavior, credit limit, annual income, interests, and the like. Various types of customer information may be stored in first entity database 112 as warranted by the business objectives of first entity 102. It will be apparent to a person skilled in the art that first entity 102 may store different types of customer information, without limitation, in first entity database 112 without deviating from the spirit and scope of the present invention. Similarly, second entity 104 includes a second entity database 114 that stores customer information of the customers of second entity 104. In various embodiments, at least a part of the customer information may be confidential due to factors such as, but not limited to, the privacy policy and/or other contractual confidentiality obligations of the entity.

Figure 14:
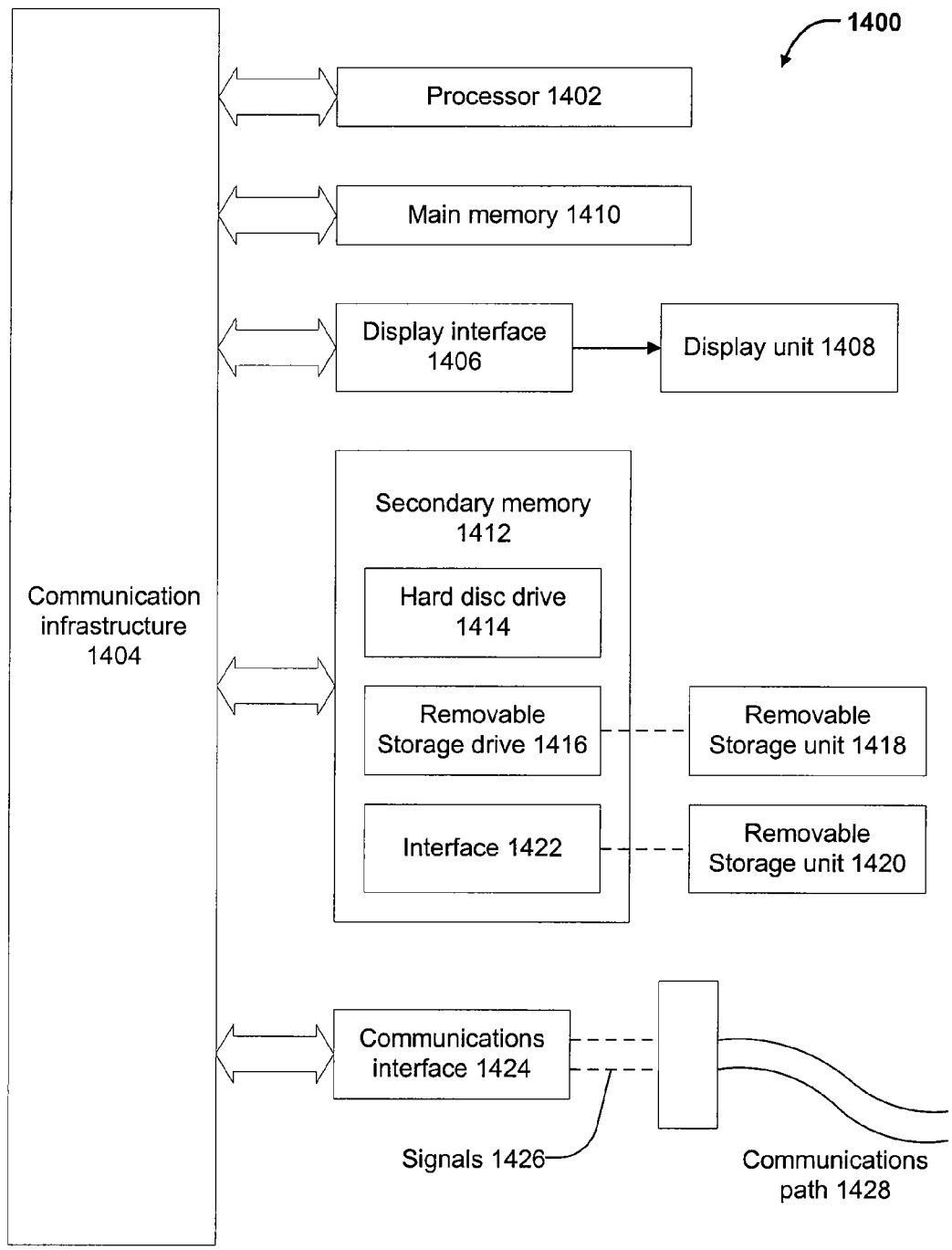
FIG. 14 is a block diagram of an example computer system suitable for implementing various embodiments of the present invention.

Third entity 106 includes a data processing module 116. As will be further described with respect to FIG. 14, the functions carried out by third entity 106 can be implemented by a computer system such as shown in FIG. 14. Data processing module 116 is communicatively coupled with first entity 102 and second entity 104 via communication links 108 and 110 respectively. In an embodiment, data processing module 116 receives customer information of a first set of customers from first entity 102. The customer information includes PII of the first set of customers. In addition, the customer information includes first entity customer attributes of the first set of customers. In an embodiment, data processing module 116 may receive customer information for the first set of customers, including PII and the first entity customer attributes, from first entity database 112 via communication link 108.

In an embodiment, data processing module 116 receives PII of a second set of customers from second entity 104 via communication link 110. In another embodiment, third entity 106 may already have the PII associated with the second set of customers in a third entity database 118.

Data processing module 116 identifies common customers between the first set of customers and the second set of customers based on the PII of the customers. In one embodiment, third entity 106 may match the PII of the first set of customers with the corresponding PII of the second set of customers in a pre-defined way. In one embodiment, first entity 102 and second entity 104 may define the way in agreement. For example, first entity 102 and second entity 104 may agree upon to use the e-mail address to identify common customers. In another example, the SSN number of the customers may be used to identify common customers. In yet another example, multiple PII items, such as, the e-mail address, the mobile telephone number and the SSN number, in one exemplary implementation, may be used to identify the common customers. In this case, a customer may be identified as a common customer if at least two of the three PII items match for the customer. Alternatively, a customer may be identified as a common customer if all three PII items match for the customer. The examples described above are for illustration purpose only and a person skilled in the art will appreciate that the PII may be used in a variety of other ways to identify common customers.

After identifying the common customers, data processing module 116 creates a list of a third set of customers. The third set of customers includes the common customers and a plurality of other customers selected from the second set of customers. In an embodiment, data processing module 116 randomly selects the plurality of other customers from the second set of customers that are not in common with the first set of customers. The other customers constitute a pre-defined proportion of the third set of customers. The pre-defined proportion is determined based upon various factors, such as but not limited to, level of desired privacy, computational costs, amount of data transfer required, and the like. A larger proportion of other customers results in increased data exchange and computational cost. On the other hand, a larger proportion of other customers results in an improved privacy level. Thus, it is necessary to optimize the proportion of the common customers to the plurality of other customers. For example, the pre-defined proportion may be chosen to be 9:10. In other words, the third set of customers will include 10% common customers and 90% other customers.

Data processing module 116 then sends the list of the third set of customers to second entity 104. Second entity 104 appends the second entity customer attributes associated with each customer in the third set of customers and returns the list to third entity 106. Data processing module 116 receives the list of the third set of customers with the appended second entity customer attributes for further processing.

Data processing module 116 further links the first entity customer attributes and the second entity customer attributes of the common customers. Data processing module 116 may then store an anonymous record for each common customer in third entity database 118. In various embodiments, the anonymous record of a common customer includes the first entity customer attributes and the second entity customer attributes of the common customer. Notably, data processing module 116 does not store the PII of the common customer in the anonymous record. In an embodiment, data processing module 116 includes a randomly generated identifier in the anonymous record. In an embodiment, the random identifier may include one or more alphabets, one or more numerals or a combination thereof. The collection of such anonymous records for the common customers is hereinafter referred to as the collated list.

In an embodiment, data processing module 116 provides the collated list to at least one of first entity 102 or second entity 104. First entity 102, second entity 104, or both may use the collated list to analyze the combined first entity and second entity customer attributes to gain desired insights. Notably, first entity 102 and second entity 104 do not need to share their customer information in a personally identifiable manner with each other in order to perform such analysis.

In one embodiment, first entity 102, second entity 104 and third entity 106 may exchange various information in the form of a text file. A person skilled in the art will appreciate that other suitable formats, for example, an Extensible Markup Language (XML) file, a Microsoft® Excel® file, and the like, may also be used to communicate the information. In various embodiments, this information may be also encrypted using known techniques in the art so that it may not be accessed by an unintended entity.

First entity database 112 and second entity database 114 may be queried using a plurality of query languages, which include, but are not limited to Object Query Language (OQL), Structured Query Language (SQL), and so on. First entity database 112 and second entity database 114 may be managed using a plurality of Database Management System (DBMS) software applications. Examples of such DBMS software applications may include Microsoft SQL SERVER™, ORACLE™ RDBMS, and the like. A person skilled in the art will recognize that the above examples of query languages and DBMS software applications are only for illustrative purposes and any such query language and/or DBMS software application may be used within the spirit and scope of the present invention.

In an embodiment, first entity database 112, second entity database 114, third entity database 118 and data processing module 116 may be located remotely with respect to each other. In another embodiment, data processing module 116 may be implemented on an application server that provides a web interface and first entity 102 and second entity 104 may access data processing module 116 using a web browser. In this case, data processing module 116 may receive the first entity customer attributes, one or more PII associated with each of the first set of customers and one or more PII associated with each of the second set of customers via a secured network. First entity 102 may initiate, facilitate, and or monitor such transfer using a web browser. Moreover, first entity 102 and second entity 104 may each be provided with a unique identifier and a corresponding password to access data processing module 116. Examples of the web browsers may include, but are not limited to, Microsoft's INTERNET EXPLORER™ browser, NETSCAPE NAVIGATOR™ browser, MOZILLA FIREFOX™ browser, OPERA™ browser, Google's CHROME™ and so on. It will be apparent to one skilled in the art that in various embodiments, third entity 106 may facilitate information exchange between any number of entities without limitation.

III. Process Overview

Figure 2:
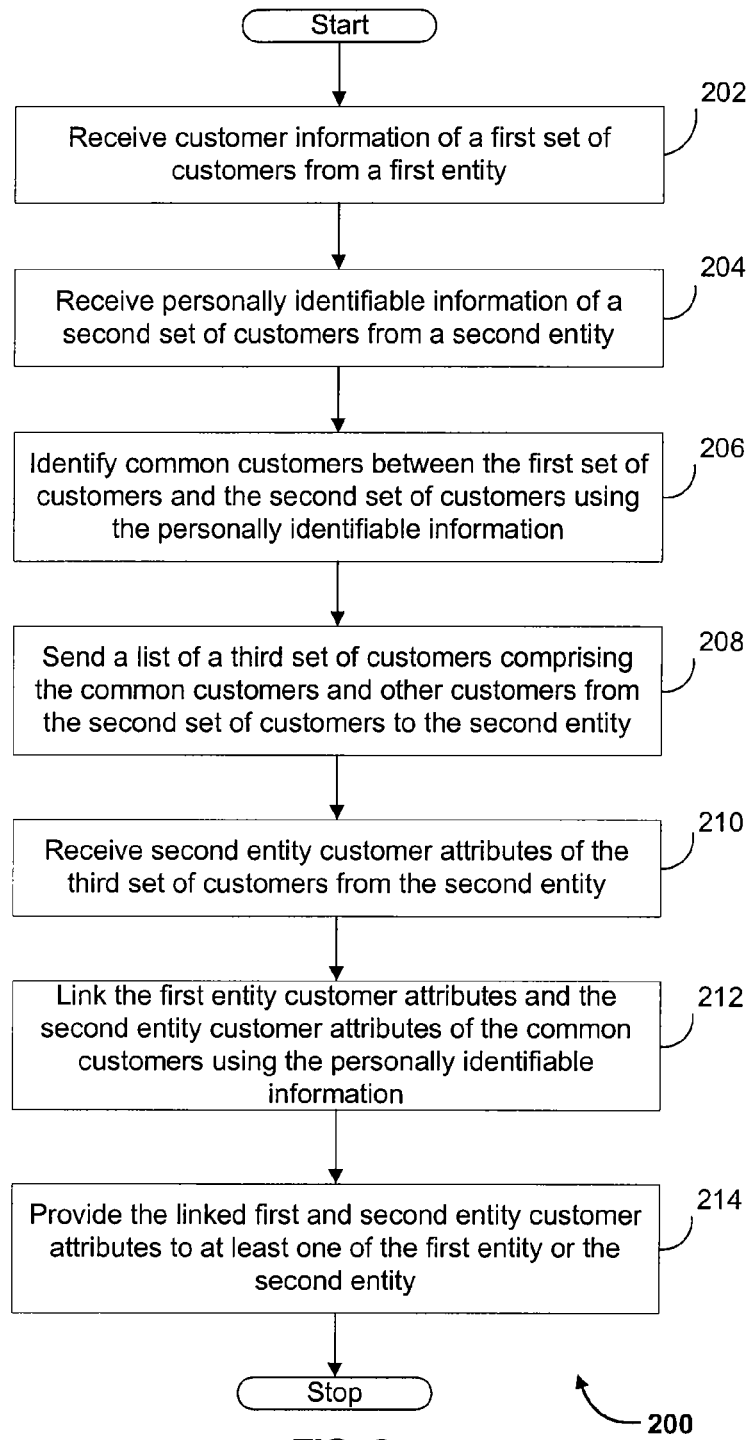
FIG. 2 is a flowchart illustrating an example process for processing customer information of a first entity and a second entity, according to an embodiment of the present invention.

FIG. 2 is a flowchart illustrating an example process 200 for processing customer information of first entity 102 and second entity 104, according to one embodiment.

In step 202, third entity 106 receives customer information of a first set of customers from first entity 102. The customer information includes PII and first entity customer attributes associated with the first set of customers.

In step 204, third entity 106 receives PII of a second set of customers from second entity 104.

In step 206, third entity 106 identifies common customers between the first set of customers and the second set of customers using the PII of the customers.

In step 208, third entity 106 sends a list of a third set of customers to second entity 104. The third set of customers includes the common customers and a plurality of other customers from the second set of customers. In one embodiment, the plurality of other customers constitutes a pre-defined proportion of the third set of customers. The pre-defined proportion is based upon various factors such as, but not limited to, level of desired privacy, computational costs, amount of data transfer required, and the like. In an embodiment, the pre-defined proportion may be chosen to be 9:10. In an embodiment, the plurality of other customers may be chosen in a random manner.

In step 210, third entity 106 receives second entity customer attributes of the third set of customers from second entity 104.

In step 212, third entity 106 links the first entity customer attributes and the second entity customer attributes for the common customers using the PII. In an embodiment, third entity 106 creates an anonymous record for each common customer and may save these anonymous records in a collated list. In various embodiments, the anonymous record of a common customer includes the first entity customer attributes and the second entity customer attributes of the common customer. Notably, third entity 106 does not store the PII of the common customer in the anonymous record. In one embodiment, third entity 106 may generate a random identifier for each of the common customer and append the random identifier to the anonymous record of that customer.

In step 214, third entity 106 may provide the collated list to at least one of first entity 102 or second entity 104. First entity 102, second entity 104 or both may then use the customer information in the collated list to augment their knowledge of their customers and take better business decisions.

Various embodiments of data processing module 116 may be deployed in different scenarios. In one exemplary case, data processing module 116 deployed at third entity 106 may be used by a credit card issuer (first entity 102) and an online advertiser (second entity 104) for exchanging customer characteristics with each other without violating any privacy rules and regulations. The credit card issuer typically tracks and stores various transactional behavior of its customers, for example, shopping preferences, number of transactions, total spend, the amount spent on various product and service segments such as fashion, jewelry, financial products, and the like. On the other hand, the online advertiser maintains its customers' online behavioral characteristics. Examples of the online behavioral characteristics may include, without limitation, number of page views, frequency and duration of web page visits across different product/service categories (e.g. travel, sports, news etc.), advertisement preferences, number of advertisements viewed across different categories, online transaction pattern and the like. The credit card issuer and the online advertiser may exchange such characteristics of their common customers with each other via third entity 106 without a need to exchange the PII information of the common customers. By correlating these two sets of characteristics, the credit card issuer and the online advertiser may identify additional behavioral trends of the common customers and may reflect these behavioral trends across respective customer bases. For example, the credit card issuer and/or the online advertiser may be able to infer that customers that spend more on fashion products also frequently visit travel-related websites and vice versa. Using this information, the online advertiser may provide advertisements for fashion products to its customers that are frequent visitors to the travel-related websites. Similarly, the credit card issuer may devise special travel offers, for example, more reward points on specific destinations, cash-back offers on hotel stay etc., to its customers spending more on fashion products.

Figure 3:
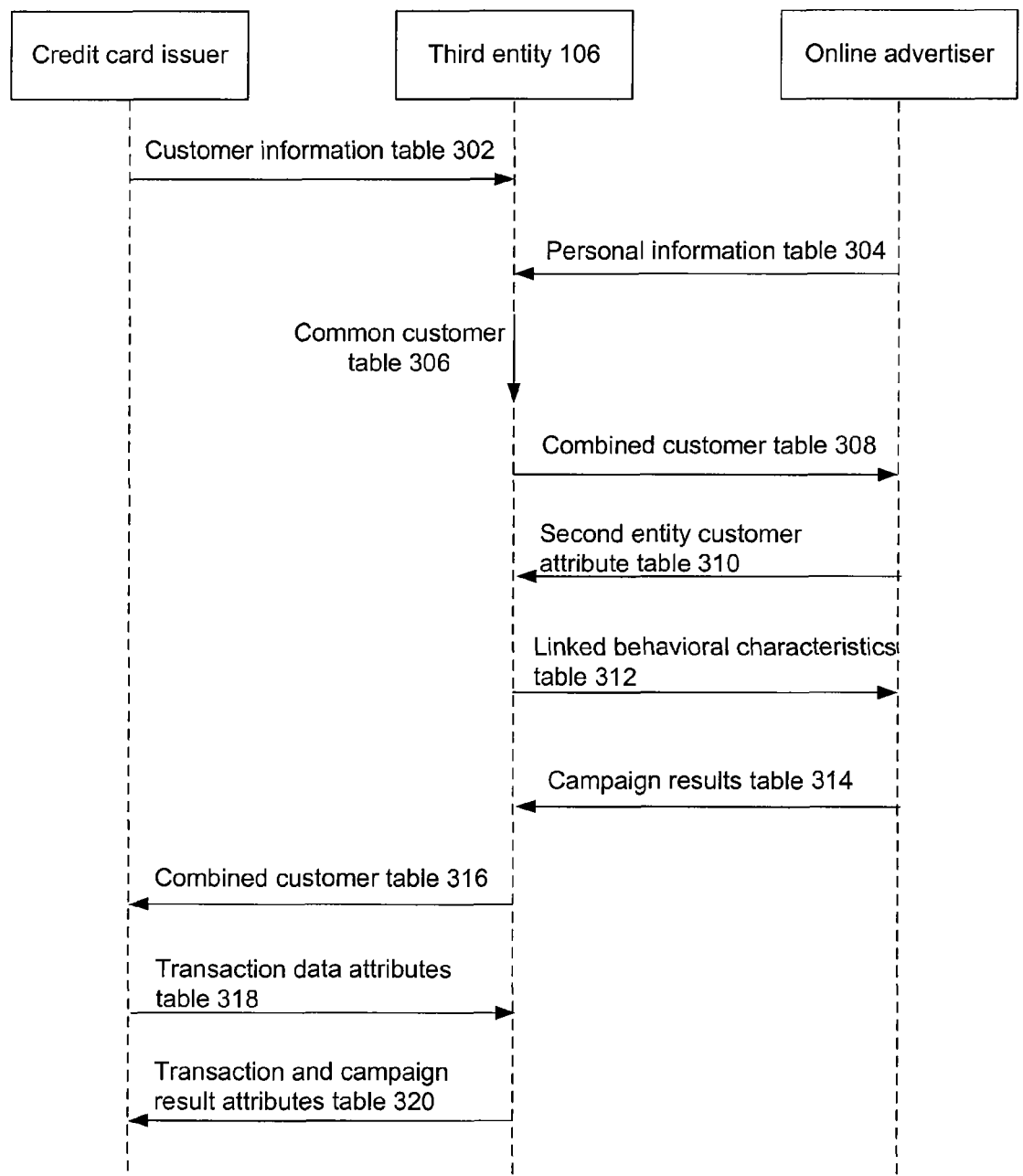
FIG. 3 illustrates an example customer information exchange between a credit card issuer and an online advertiser, according to an embodiment of the present invention.

FIG. 3 illustrates an exemplary exchange of customer characteristics between the credit card issuer and the online advertiser, according to one embodiment. The credit card issuer sends the customer information of a first set of its customers to third entity 106 in a customer information table 302. An exemplary customer information file is illustrated in FIG. 4. As shown in FIG. 4, customer information table 302 includes e-mail address (the PII) and spending behavior of customers across different segments (the first entity customer attributes) for the first set of customers. The columns Seg. A, Seg. B, Seg. C and Seg. D may represent different segments, such as, fashion, travel, consumer durables, and jewelry, respectively. In one exemplary implementation, a "1" in a particular segment column for a customer may indicate that the customer spends a significant amount on products/services in that segment, whereas a "0" may indicate that the customer does not spend significant amount in that segment. For an example illustrated in FIG. 4, the customer with e-mail address User1@abc.com spends significantly in segment A, whereas the customer with e-mail address User5@xyz.com spends significantly in segments B and C. In various embodiments, a customer may be segmented into a particular segment when the customer satisfies a certain condition, for example, the customer's spend in that segment exceeding a pre-defined proportion of this total spend, or the customer's total spend in that segment exceeding a pre-defined amount or any such suitable criterion. Consequently, some of the customers, User7@abc.com and User8@xyz.com in this case, may not be segmented into any of the segments.

Returning to FIG. 3, third entity 106 may also receive the PII from the online advertiser for a second set of customers of the online advertiser. In an exemplary implementation, third entity 106 receives the PII in a personal information table 304. One example of personal information table 304 is illustrated in FIG. 5. In one embodiment, personal information table 304 may also include the customers' identifiers specific to the online advertiser.

Third entity 106 may then identify common customers between the first set of customers and the second set of customers using the PII (as described earlier). In one embodiment, third entity 106 may maintain a list of the common customers in a common customer table 306 as illustrated in FIG. 6. Common customer table 306 includes the PII of the common customers. Common customer table 306 may also include the common customers' identifiers specific to the online advertiser.

Thereafter, third entity 106 prepares a combined list of customers that includes the common customers and the online advertiser's other customers that are not common with the credit card issuer. The non-common customers in the combined list are selected as explained earlier. Subsequently, third entity 106 sends the combined list of customers to the online advertiser in a combined customer table 308. One example of combined customer table 308 is illustrated in FIG. 7. As shown in FIG. 7, combined customer table 308 includes the online advertiser specific customer identifier for each of the common and non-common customers. Combined customer table 308 may additionally include the PII for the combined list of customers.

Figure 8:
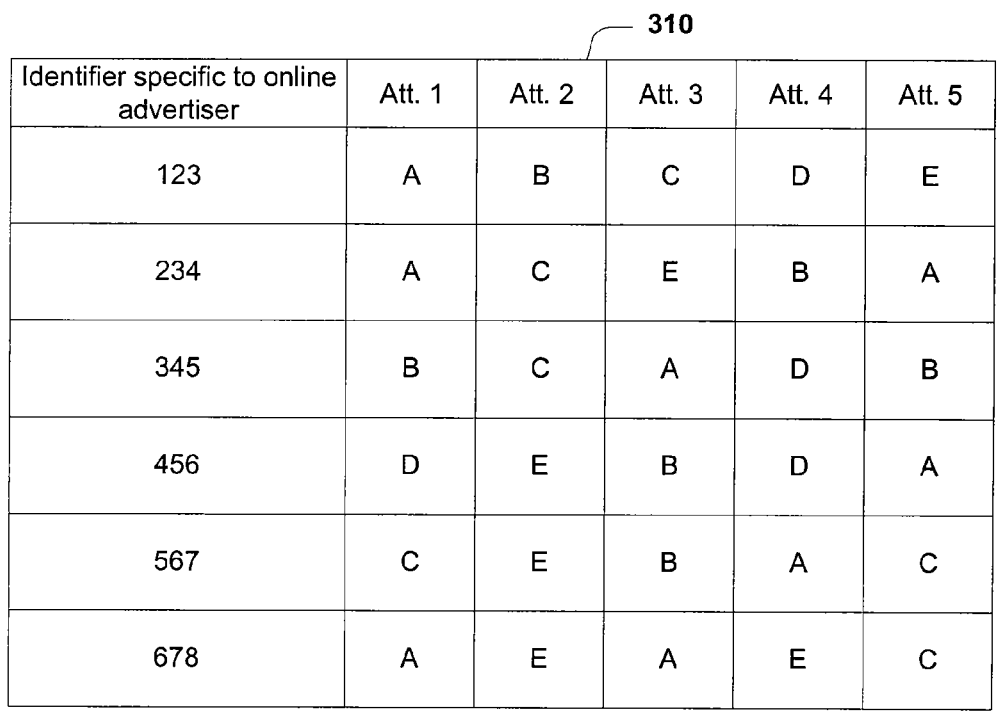
FIG. 8 illustrates an example second entity customer attributes table representing online characteristics of the combined customers, according to an embodiment of the present invention.

The online advertiser now has a list of its own customers that includes the customers that are common with the credit card issuer. However, since the list of combined customers also includes the non-common customers in the pre-defined proportion, the online advertiser can not identify the common customers, thereby protecting privacy of the common customers. The online advertiser retrieves online browsing behavior characteristics (the second entity customer attributes) of the combined set of customers using the online advertiser specific identifiers, the PII or both. The online advertiser then sends these characteristics to third entity 106 in a second entity customer attribute table 310, according to one embodiment. FIG. 8 illustrates an exemplary second entity customer attribute table 310. In an example shown in FIG. 8, second entity customer attribute table 310 presents the combined customers' browsing frequency associated with five different categories of web pages, namely, sports, news, travel, leisure, and education and is represented by attributes—Att. 1-Att. 5, respectively. A person skilled in the art will appreciate that the attributes mentioned above are for illustrative purpose only and other suitable attributes may be used without deviating from the spirit and scope of the invention. In the example shown in FIG. 8, the browsing frequency for each category is represented by an alphabet, though one or more alphabets, one or more numerals, one or more special characters or combinations thereof may be used in conjunction with various embodiments. In one exemplary implementation presented in FIG. 8, the browsing frequency may be captured in a tiered manner using the alphabets A-E with "A" corresponding to "Daily", "B" corresponding to "4-5 time a week", "C" corresponding to "4-5 times a month", "D" corresponding to "Occasionally" and "E" corresponding to "Almost Never". One skilled in art will recognize numerous other ways to represent such characteristics without deviating from the spirit and scope of the invention.

Returning to FIG. 3, third entity 106 may then link the spending behavior and the online behavior characteristics for the common customers using the PII and save the linked characteristics in a linked behavioral characteristics table 312, according to one embodiment. Third entity 106 may also eliminate the PII from linked behavioral characteristics table 312. Further, third entity 106 may also append a random identifier for each common customer as illustrated in FIG. 9. Third entity 106 subsequently sends linked behavioral characteristics table 312 to the online advertiser, in one embodiment. According to another embodiment, third entity 106 may also send linked behavioral characteristics table 312 to the credit card issuer.

The online advertiser now has the common customers' spending characteristics directly associated with the online advertiser's attributes representing the common customers' online behavior characteristics. However, since linked behavioral characteristics table 312 does not contain any PII or the online advertiser's customer identifiers, individual customer's identity may not be revealed to the online advertiser and thus, no privacy rules may be violated. The online advertiser may infer behavioral patterns in the common customers using these customers' spending as well as online behavioral characteristics. The online advertiser may then use such information in a variety of ways. In one embodiment, the online advertiser may develop a new advertising model or may modify an existing advertisement model to incorporate the information derived from linked behavioral characteristics table 312. For example, if linked behavioral characteristics table 312 indicates that customers who are frequent visitors to the sports-related websites also spend significantly in the fashion industry, the online advertiser may modify the existing advertisement model or build a new advertisement model such that its customers that are frequent visitors to the sports-related websites are served advertisements related to fashion products.

In some embodiments, the online advertiser may also initiate a test campaign to test the new or the modified advertisement model. The online advertiser may select a plurality of customers in its customer base according to aspects of the new or the modified model that the online advertiser wishes to test. The plurality of customers may be selected for the test campaign using various techniques known in the art. In an embodiment, the selected customers (hereinafter interchangeably referred to as exposed customers) may be divided into four different groups. First group represents a TEST population that is exposed to advertisements according to the new/modified advertisement model. Second group represents a CONTROL population that is exposed to control (neutral or non-sale) advertisements. Third group represents a TEST population that is exposed to advertisements according to the existing advertisement model. Fourth group represents a CONTROL population that is exposed to control (neutral or non-sale) advertisements. Throughout the duration of the test campaign, the online advertiser may monitor one or more parameters, such as, without limitation, number of times a customer logged into the online advertiser's website, number of times a customer was exposed to the advertisements in the test campaign, number of times a customer clicked on a particular advertisement provided in the test campaign and the like, for customers in each of the four groups.

The online advertiser may then collate the monitored parameters for the test campaign in a test campaign results table 314. An exemplary test campaign results table 314 is illustrated in FIG. 10. Test campaign results table 314 may include a row for each exposed customer listing values for the monitored parameters (the second entity customer attributes), the PII and the group which the customer belonged to in the test campaign. In an example shown in FIG. 10, a customer with e-mail address User1@abc.com, and belonging to the first group, logged into the online advertiser's website twenty three times, was exposed to advertisements in accordance with the new advertisement model twelve times and clicked on the advertisements nine times. Though the above mentioned example shows that the exposed customers include one or more of the common customers, a person skilled in the art will appreciate that the exposed customers may or may not include the common customers, since the online advertiser has no knowledge of the identity of the common customers.

In an embodiment, the credit card issuer may request the results of the test campaign to analyze to report the results of the test. In another embodiment, the online advertiser may initiate a transfer of the test campaign results to the credit card issuer. To preserve privacy of the exposed customers, the online advertiser may send test campaign results table 314 to third entity 106, according to one embodiment. Thereafter, third entity 106 may identify common customers between the exposed customers and the credit card issuer's customers. In one embodiment, the credit card issuer's customers may be obtained from customer information table 302. Thereafter, third entity 106 may prepare a combined customer table 316 that includes the common and non-common customers between the exposed customers and the first set of customers using similar methods described earlier. FIG. 11 illustrates an exemplary implementation of combined customer table 316. Combined customer table 316 includes the e-mail addresses of the common as well as non-common customers. Further, third entity 106 may send combined customer table 316 to the credit card issuer.

In various embodiments, the credit card issuer may wish to correlate its customers' transaction data (the first entity customer attributes) during the test campaign with the campaign results and may wish to compare it with the transaction data for these customers before the test campaign. In such a case, the credit card issuer may send a transaction data attributes table 318 that includes one or more attributes representing the transaction data for the combined customers in combined customer table 316. FIG. 12 illustrates such a transaction data attributes table 318 according to one exemplary implementation. As depicted in FIG. 12, transaction data attributes table 318 includes number of transactions and total spend at the advertised merchant and total number of transactions and spend amounts of a customer in the pre- and test campaign period. For example, a customer with e-mail address User1@abc.com spent $5600 in 15 transactions at the advertised merchant and a total of $8600 in 21 transactions during the pre-test campaign period. During the test campaign period, the customer spent $7000 in 13 transactions at the advertised merchant and a total of $11650 in 19 transactions. In some embodiments, the transaction and spend data may also be segregated across different segments.

Third entity 106 removes the non-common customers and links the transaction data and the campaign results for the common customers to generate a transaction and campaign result attributes table 320. as shown in FIG. 13 which illustrates an example transaction and campaign result attributes table representing the campaign results and the spend behavior attributes for the common customers of the exposed customers and the credit card issuer's customers.

Further, third entity 106 removes the PII for the common customers and may append a random identifier for every common customer. Thus, transaction and campaign result attributes table 320 represents online behavioral characteristics of the common customers during the test campaign vis-à-vis the transaction data for these customers during the pre- and test campaign period. Notably, transaction and campaign result attributes table 320 does not contain any PII for these customers, and hence, the credit card issuer may not be able to identify individual customers. Thereafter, third entity 106 sends transaction and campaign result attributes table 320 to the credit card issuer. The credit card issuer may then use information from transaction and campaign result attributes table 320 for various purposes, for example, to analyze effectiveness of the test campaign, to modify its existing spend model, to update the customers' preferences and spend behavior and the like. For example, the credit card issuer may analyze a change in the customers' spending pattern after the customers were exposed to the test campaign, or may optimize its model for designing targeted product/service offers for a particular customer segment etc. Further, the credit card issuer may generate post-campaign reports and share the post-campaign reports with the online advertiser and/or other partners.

IV. Example Implementations

The present invention (i.e., system 100, process 200, or any part(s) or function(s) thereof) may be implemented using hardware, software or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

In fact, in accordance with an embodiment, the present invention is directed toward one or more processor-based computing and data processing systems capable of carrying out the functionality described herein. An example of such a processor based computing and data processing system includes a computer system 1400, which is shown in FIG. 14. A computer system such as computer system 1400 can be specially configured and arranged to carry out the functions of "third entity" 106 shown in FIG. 1 and described in the flowcharts shown in FIGS. 2 and 3.

Computer system 1400 includes at least one processor, such as a processor 1402. Processor 1402 is connected to a communication infrastructure 1404, for example, a communications bus, a cross over bar, a network, and the like. Various software embodiments are described in terms of this exemplary computer system 1400. After reading this description, it will become apparent to a person skilled in the relevant art(s) how to implement the present invention using other computer systems and/or architectures.

Computer system 1400 includes a display interface 1406 that forwards graphics, text, and other data from communication infrastructure 1404 (or from a frame buffer which is not shown in FIG. 14) for display on a display unit 1408.

Computer system 1400 further includes a main memory 1410, such as random access memory (RAM), and may also include a secondary memory 1412. Secondary memory 1412 may further include, for example, a hard disk drive 1414 and/or a removable storage drive 1416, representing a floppy disk drive, a magnetic tape drive, an optical disk drive, etc. Removable storage drive 1416 reads from and/or writes to a removable storage unit 1418 in a well known manner. Removable storage unit 1418 may represent a floppy disk, magnetic tape or an optical disk, and may be read by and written to by removable storage drive 1416. As will be appreciated, removable storage unit 1418 includes a computer usable storage medium having stored therein, computer software and/or data.

In accordance with various embodiments of the present invention, secondary memory 1412 may include other similar devices for allowing computer programs or other instructions to be loaded into computer system 1400. Such devices may include, for example, a removable storage unit 1420, and an interface 1422. Examples of such may include a program cartridge and cartridge interface (such as that found in video game devices), a removable memory chip (such as an erasable programmable read only memory (EPROM), or programmable read only memory (PROM)) and associated socket, and other removable storage units 1420 and interfaces 1422, which allow software and data to be transferred from removable storage unit 1420 to computer system 1400.

Computer system 1400 may further include a network interface 1424. Network interface 1424 allows software and data to be transferred between computer system 1400 and external devices. Examples of network interface 1424 include, but may not be limited to a modem, a network interface (such as an Ethernet card), a communications port, a Personal Computer Memory Card International Association (PCMCIA) slot and card, and the like. Software and data transferred via network interface 1424 are in the form of a plurality of signals, hereinafter referred to as signals 1426, which may be electronic, electromagnetic, optical or other signals capable of being received by network interface 1424. Signals 1426 are provided to network interface 1424 via a communication path (e.g., channel) 1428. Communication path 1428 carries signals 1426 and may be implemented using wire or cable, fiber optics, a telephone line, a cellular link, a radio frequency (RF) link and other communication channels. Communication path 1428 facilitates exchange of data between the first (102) and third (106) entities and the second (104) and third (106) entities as shown in FIG. 1. The various storage units and drives, such as removable storage unit 1418, removable storage unit 1420, main memory 1410 and secondary memory 1412 receive, store and provide various data exchanged between first entity 102 and second entity 104 (FIG. 1) in various stages of the processes shown in the flow charts of FIGS. 2 and 3 Program code for causing the computing system 1400 to carry out the processes shown at least in part in FIGS. 2 and 3 is executed by processor 1402 which coordinates the operations of the various peripheral devices and communications infrastructure and interface shown in FIG. 14.

In this document, the terms "computer program medium" and "computer usable medium" are used to generally refer to media such as removable storage drive 1416, a hard disk installed in hard disk drive 1414, signals 1426, and the like. These computer program products provide software to computer system 1400. The present invention is directed to such computer program products.

Computer programs (also referred to as computer control logic) are stored in main memory 1410 and/or secondary memory 1412. Computer programs may also be received via network interface 1424. Such computer programs, when executed, enable computer system 1400 to perform the features of the present invention, as discussed herein. In particular, the computer programs, when executed by processor 1402 cause the computer system to be configured and arranged to perform the various processes of the present invention as described. Accordingly, such computer programs represent controllers of computer system 1400.

In accordance with an embodiment, where the invention is implemented using a software, the software may be stored in a computer program product and loaded into computer system 1400 using removable storage drive 1416, hard disk drive 1414 or network interface 1424. The control logic (software), when executed by processor 1402, causes processor 1402 to perform the functions of the present invention as described herein.

In another embodiment, the present invention is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present invention is implemented using a combination of both the hardware and the software.

V. Conclusion

It is to be appreciated that the Detailed Description section, and not the Summary and Abstract sections, is intended to be used to interpret the claims. The Summary and Abstract sections can set forth one or more but not all exemplary embodiments of the present invention as contemplated by the inventor(s), and thus, are not intended to limit the present invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Various embodiments of the present invention have been described above. It should be understood that they have been presented by way of example only, and not limitation. It will be apparent to persons skilled in the relevant art that various changes in form and detail can be made from those specifically described without departing from the spirit and scope of the invention. Thus, the breadth and scope of the present invention should not be limited by any of the above-described exemplary embodiments, but should be defined only in accordance with the following claims and their equivalents.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the drawings are directed to both principles of the invention and to specific "embodiment" implementations or examples. They highlight functionality and advantages of the present invention, and are presented as examples to help in understanding the invention. The architecture of the present invention is sufficiently flexible and configurable, such that it may be utilized (and navigated) in ways other than that shown in the accompanying figures.

Further, the purpose of the Abstract associated with this patent document is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method comprising:
   receiving, by a computer-based system capable of linking customer information, customer information of a first set of customers from a first entity, wherein the customer information comprises personally identifiable information and first entity customer attributes for the first set of customers;
   receiving, by the computer-based system, personally identifiable information for a second set of customers from a second entity;
   identifying, by the computer-based system, common customers between the first set of customers and the second set of customers using the personally identifiable information;
   sending, by the computer-based system, a list of a third set of customers to the second entity, wherein the third set of customers comprises the common customers and a plurality of non-common customers from the second set of customers;
   receiving, by the computer-based system, second entity customer attributes of the third set of customers from the second entity;
   linking, by the computer-based system, the first entity customer attributes and the second entity customer attributes of the common customers using the personally identifiable information;
   receiving, by the computer-based system and from the second entity, test results from an advertising campaign involving the common customers and the non-common customers;
   removing, by the computer-based system, common customer test result data; and
   transmitting, by the computer-based system, common customer test result data to the first entity.

2. The method of claim 1, further comprising: providing, by the computer-based system, the linked first entity customer attributes and the second entity customer attributes to at least one of the first entity and the second entity.

3. The method of claim 1, wherein the linking comprises:
   generating, by the computer-based system, a random identifier for each common customer; and
   creating, by the computer-based system, an anonymous record for each common customer, wherein the anonymous record comprises the random identifier, the first entity customer attributes, and the second entity customer attributes of the common customer.

4. The method of claim 1, wherein the first entity and the second entity are selected from a group consisting of a credit card merchant and an online marketer.

5. The method of claim 1, wherein the personally identifiable information comprises at least one of an e-mail address, a telephone number, a social security number, a name, a postal address, and a date of birth.

6. The method of claim 1, wherein the first entity customer attributes and the second entity customer attributes are selected from a group consisting of spending behavior, online behavior, customer preferences, annual income, and distribution of spend by segment.

7. The method of claim 1, wherein the plurality of non-common customers comprises randomly selected customers from the second set of customers that are not common customers.

8. The method of claim 1, wherein the plurality of non-common customers constitute a pre-defined proportion of the third set of customers.

9. A system comprising:
   a processor capable of linking customer information,
   a tangible, non-transitory memory configured to communicate with the processor,
   the tangible, non-transitory memory having instructions stored thereon that, in response to execution by the processor, cause the processor to be capable of performing operations comprising:

receiving, by the processor, customer information of a first set of customers from a first entity, wherein the customer information comprises personally identifiable information and first entity customer attributes for the first set of customers;

receiving, by the processor, personally identifiable information for a second set of customers from a second entity;

identifying, by the processor, common customers between the first set of customers and the second set of customers using the personally identifiable information;

sending, by the processor, a list of a third set of customers to the second entity, wherein the third set of customers comprises the common customers and a plurality of non-common customers from the second set of customers;

receiving, by the processor, second entity customer attributes of the third set of customers from the second entity; and linking, by the processor, the first entity customer attributes and the second entity customer attributes of the common customers using the personally identifiable information;

receiving, by the processor and from the second entity, test results from an advertising campaign involving the common customers and the non-common customers;

removing, by the processor, non-common customer test result data; and transmitting, by the processor common customer test result data to the first entity.

10. The system of claim 9, further comprising providing, by the processor, the linked first entity customer attributes and the second entity customer attributes to at least one of the first entity and the second entity.

11. The system of claim 9, further comprising:
generating, by the processor, a random identifier for each common customer; and
creating, by the processor, an anonymous record for each common customer, wherein the anonymous record comprises the random identifier, the first entity customer attributes, and the second entity customer attributes of the common customer.

12. The system of claim 9, wherein the plurality of non-common customers comprises randomly selected customers from the second set of customers that are not common customers.

13. The system of claim 9, wherein the plurality of non-common customers constitute a pre-defined proportion of the third set of customers.

14. An article of manufacture including a non-transitory, tangible computer readable storage medium having instructions stored thereon that, in response to execution by a computer-based system capable of linking customer information, cause the computer-based system to be capable of performing operations comprising:

receiving, by the computer-based system, customer information of a first set of customers from a first entity, wherein the customer information comprises personally identifiable information and first entity customer attributes for the first set of customers;

receiving, by the computer-based system, personally identifiable information for a second set of customers from a second entity;

identifying, by the computer-based system, common customers between the first set of customers and the second set of customers using the personally identifiable information;

sending, by the computer-based system, a list of a third set of customers to the second entity, wherein the third set of customers comprises the common customers and a plurality of non-common customers from the second set of customers;

receiving, by the computer-based system, second entity customer attributes of the third set of customers from the second entity;

linking, by the computer-based system, the first entity customer attributes and the second entity customer attributes of the common customers using the personally identifiable information;

removing, by the computer-based system and from the second entity, test results from an advertising campaign involving the common customers and the non-common customers;

removing by the computer-based system, non-common customer test result data; and transmitting, by the computer-based system, common customer test result data to the first entity.

15. The article of manufacture of claim 14, further comprising:
providing, by the computer-based system, the linked first entity customer attributes and the second entity customer attributes to at least one of the first entity and the second entity.

16. The article of manufacture of claim 14, further comprising:
generating, by the computer-based system, a random identifier for each common customer; and
creating, by the computer-based system, an anonymous record for each common customer, wherein the anonymous record comprises the random identifier, the first entity customer attributes, and the second entity customer attributes of the common customer.

* * * * *

UNITED STATES PATENT AND TRADEMARK OFFICE
CERTIFICATE OF CORRECTION

PATENT NO. : 8,838,629 B2
APPLICATION NO. : 12/605052
DATED : September 16, 2014
INVENTOR(S) : Mehmet E. Dedeoglu et al.

Page 1 of 1

It is certified that error appears in the above-identified patent and that said Letters Patent is hereby corrected as shown below:

In the Claims,

In Column 18 Line 24, please delete "common" and insert therefor --non-common--.

In Column 18 Line 42, after card, please insert --issuer, a--.

In Column 20 Line 28, please delete "removing" and insert therefor --receiving--.

Signed and Sealed this
Second Day of December, 2014

Michelle K. Lee
*Deputy Director of the United States Patent and Trademark Office*